US006993676B2

(12) United States Patent
Corbin et al.

(10) Patent No.: US 6,993,676 B2
(45) Date of Patent: Jan. 31, 2006

(54) METHOD AND APPARATUS FOR FAST INITIALIZATION OF REDUNDANT ARRAYS OF STORAGE DEVICES

(75) Inventors: John Corbin, El Paso, TX (US); Ebrahim Hashemi, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 581 days.

(21) Appl. No.: 10/170,937

(22) Filed: Jun. 12, 2002

(65) Prior Publication Data

US 2003/0233596 A1 Dec. 18, 2003

(51) Int. Cl.
G06F 11/00 (2006.01)
(52) U.S. Cl. ............................................ 714/5; 714/13
(58) Field of Classification Search .................... 714/5, 714/6, 7, 8, 13, 15, 18, 42, 43, 11; 711/166, 711/221, 170, 114, 162, 133, 134
See application file for complete search history.

(56) References Cited

U.S. PATENT DOCUMENTS

| 5,519,844 | A | * | 5/1996 | Stallmo | ..................... 711/114 |
| 5,812,753 | A | * | 9/1998 | Chiariotti | ..................... 714/6 |
| 5,943,689 | A | * | 8/1999 | Tamer | ..................... 711/166 |
| 5,974,544 | A | * | 10/1999 | Jeffries et al. | ..................... 713/1 |
| 6,035,412 | A | * | 3/2000 | Tamer et al. | ..................... 714/6 |
| 6,058,455 | A | * | 5/2000 | Islam et al. | ..................... 711/114 |
| 6,154,854 | A | * | 11/2000 | Stallmo | ..................... 714/6 |
| 6,665,740 | B1 | * | 12/2003 | Mason, Jr. et al. | ..................... 701/6 |

OTHER PUBLICATIONS

David A Patterson, Garth Gibson, and Randy H. Katz; A Casé for Redundant Arrays of Inexpensive Disks (RAID); 1988; University of Berkeley, Callifornia.

* cited by examiner

*Primary Examiner*—Nadeem Iqbal
(74) *Attorney, Agent, or Firm*—Robert C. Kowert; Meyertons, Hood, Kivlin, Kowert & Goetzel, P.C.

(57) ABSTRACT

A method and apparatus for fast initialization of storage devices. An apparatus is described including a redundant array of storage devices that comprises a logical volume of storage. The logical volume further comprises a plurality of stripes. A bit mapped vector provides state initialization information for each of the plurality of stripes in lieu of initializing each of the stripes. A storage controller initializes each of the plurality of stripes by using accesses to the redundant array while concurrently allowing access to the plurality of stripes. Initialization of a stripe can be done by processing a write access. Associated written data to the stripe and updating its corresponding redundancy effectively initializes that stripe. The bit mapped vector is updated to reflect the initialization of that stripe. In addition, while the redundant array is idle, further initialization of un-initialized stripes occurs while concurrently allowing access to the redundant array.

45 Claims, 6 Drawing Sheets

Fig. 5

METHOD AND APPARATUS FOR FAST INITIALIZATION OF REDUNDANT ARRAYS OF STORAGE DEVICES

BACKGROUND OF THE INVENTION

1. Field of the Invention

Various embodiments of the present invention relate to the field of data storage systems. More particularly, various embodiments of the present invention relate generally to the initialization of a redundant array of storage devices with concurrent access to the redundant array of storage devices.

2. Related Art

Secondary data storage is an integral part of most data processing systems. A typical data storage system in the past utilized a single, expensive magnetic disk for storing large amounts of data. This single disk in general is accessed by the Central Processing Unit (CPU) through a separate Direct Memory Access (DMA) controller. The DMA controller then translates and executes the Input/Output (I/O) requests of the CPU. For single disk memory storage systems, the speed of data transfer to and from the single, large disk is much slower than the processing speed of the CPU and acts as a data processing bottleneck.

In response, redundant arrays of independent disks (RAIDs) have evolved from the single disk storage systems in order to match the speed of secondary storage access with the increasingly faster processing speeds of the CPU. To increase system throughput, the RAID architecture of secondary storage allows for the concurrent access of data from multiple disk drives.

The concept for the RAID architecture was first formalized in an article written by some members of the Department of Electrical Engineering and Computer Sciences at the University of California at Berkeley, entitled: "A Case for Redundant Arrays of Inexpensive Disks (RAID)," by D. A. Patterson, G. Gibson, and R. H. Katz, ACM SIGMOD Conference, Chicago, Ill., June 1988, hereinafter referred to as "Patterson et al." and incorporated herein as background.

Typically, RAID architectures consist of one or more host interface controllers connected to several peripheral interface controllers via a high speed data bus. Each peripheral interface controller is, in turn, connected to several individual disk drives which provide the secondary storage for the connected hosts. Peripheral interface controllers, also referred to as array controllers herein, can be connected to the disk drives via common communication interfaces (e.g., SCSI). Generally, the speed of the data bus is greater than the speed of the interface between the disk drives and the peripheral interface controllers.

In order to reconstruct lost data in a redundancy group due to a failed disk, the system must define a reversible mapping from the data to its redundancy data in the group containing the lost data. Patterson et al. describe in their paper several such mappings. One such mapping is the RAID level 1 mapping that defines mirrored pairs of data. Essentially, identical copies of data exist on both of the mirrored pairs of physical drives. Another such mapping is the RAID level 4 (RAID-4) mapping that defines a group as an arbitrary number of disk drives containing data and a single redundancy disk. The redundancy disk is a separate disk apart from the data disks.

Still another mapping is the RAID level 5 (RAID-5) mapping. The RAID-5 mapping distributes the redundancy data across all the disks in the redundancy group in addition to distributing the data across all disks in a RAID 4 mapping scheme. As such, there is no single or separately dedicated parity disk. This distribution of the redundancy alleviates the dedicated redundancy drive(s) as the bottleneck for overlapping write operations to the array.

A RAID logical array is created by consecutively mapping stripe units from a set of physical devices. For example, Prior Art FIG. 1 illustrates a storage array 100 comprising n-storage devices (device 0, 110; device 1, 120; on up to device n-1, 130; and device n, 140) in a RAID-5 configuration. A stripe (e.g., stripe-0 150 and stripe-1 160) includes its set of consecutive stripe units across the physical devices and its corresponding redundancies. For example, stripe-0 150 consists of stripe units 0 through n-1. Stripe-0 150 also includes redundancy (e.g., parity) in device-n 140. Correspondingly, stripe-1 160 consists of stripe units n through 2n-1. The redundancy parity for stripe-1 160 is located in device n-1 130.

Each stripe can have one or more redundancies. A logical device with r redundancies can have any of its data available even in case of any simultaneous r physical device failures. As such, any failed physical device can be replaced with a functional physical device and the missing data from the failed physical device can be reconstructed.

Normally, the set of consecutive stripe units, starting from the first physical device 110, is initialized before any read or write accesses are performed on the array 100. For example, in normal operation, RAID volumes typically require that the data stored on the storage devices in the array be in a known state. This is to ensure that each redundancy unit on the RAID array 100 is initially consistent with the data contained in the corresponding stripe units. To ensure this, RAID arrays start a lengthy initialization operation right after the creation of the RAID array. Typically, an array of physical devices is initialized by writing known data to the entire volume. This initialization writes data patterns (normally 0s for even parity) on the stripes and their corresponding redundancies.

A specific drawback to the initialization process in the prior art is the significant downtime of the RAID array when undergoing initialization. Essentially, the RAID array cannot be accessed or utilized until this initialization process has been completed. The downtime can be significant and can amount to multiple hours. For example, a RAID array comprising 160 gigabyte drives with 20 megabytes/sec sustained write bandwidth will require at least 8,000 seconds (approximately 2.5 hours) to complete its initialization, during which the volume is unavailable for access. The issue of downtime associated with the initialization process can worsen when the disk controller becomes the bottleneck and the write rate to each drive falls below 20 megabytes/sec.

SUMMARY OF THE INVENTION

Various embodiments of the present invention disclose a method and system for fast initialization of storage devices. Embodiments of the present invention may eliminate the lengthy downtime typically associated with initialization of storage devices. In addition, various embodiments initialize the storage devices while allowing concurrent access to the storage devices.

Specifically, embodiments of the present invention describe an apparatus including a logical volume of storage comprising a redundant array of storage devices. The logical volume further comprises a plurality of stripes throughout the redundant array of storage devices. A bit mapped vector provides state initialization information for each of the plurality of stripes. A storage controller initializes each of the plurality of stripes by using write accesses to the redundant array while concurrently allowing access to the array and its corresponding logical volume of storage. After initialization of a particular stripe, the corresponding bit in the bit mapped vector is updated to reflect the initialization of that stripe.

Initializing the bit mapped vector occurs in seconds, whereas initializing the entire redundant array can take hours. Also, the bit mapped vector can be stored in a non-volatile and fault tolerant region of the logical volume and/or in non-volatile random access memory (NVRAM).

Once all the plurality of stripes have been initialized, the bit mapped vector can be freed. A global initialization bit can be set to indicate that the entire redundant array comprising the plurality of stripes is initialized. In this way, normal access to the redundant array can occur without checking to determine if the accessed data stripe is initialized.

In other embodiments of the present invention, a method is described for fast initialization of the redundant array of storage devices while concurrently allowing access to the redundant array. The method performs initialization by using accesses to the redundant array. Upon receiving an access request for a piece of data in a data stripe in the redundant array, the bit for that data stripe is referenced to determine if the data stripe is initialized. If the stripe has not yet been initialized ("hereinafter referred to as un-initialized") processing a write access effectively initializes the stripe. Thereafter, the bit mapped vector is updated to reflect the initialization of that stripe. In this case, any piece of data in the stripe not currently being written is assumed to be the default pattern (e.g., zeroes when even parity is used for redundancy).

For instance, a bit set to "1" indicates its corresponding storage unit is un-initialized, and the data located on the storage unit does not correspond to its redundancy and is not valid. On the other hand, a bit set to "0" indicates its corresponding storage unit is initialized, and data located on the storage unit corresponds to its redundancy and is valid.

In one embodiment, when a bit corresponding to a storage unit being accessed from a write request indicates the storage unit is un-initialized, data written to the storage unit and the updating of its corresponding redundancy by the storage controller initializes the storage unit. The corresponding bit for the storage unit can then be set by the storage controller to indicate the storage unit is initialized.

When a bit corresponding to a storage unit being accessed from a read request indicates the storage unit is un-initialized, the storage controller can return exception alerts either via defined error messages, or predetermined initialization values, without accessing the storage unit. Further, the storage controller can initialize the storage unit by writing the predetermined initialization values to the storage unit and updating its corresponding redundancy. The corresponding bit for the storage unit can then be set by the storage controller to indicate the storage unit is initialized.

In still other embodiments, a method is described for faster initialization of the redundant array of storage devices. While the redundant array is idle, further initialization of un-initialized stripes occurs while concurrently allowing access to the redundant array. In this manner, full initialization of the redundant array occurs more rapidly than solely using write accesses for initialization.

BRIEF DESCRIPTION OF THE DRAWINGS

PRIOR ART

DETAILED DESCRIPTION OF THE INVENTION

Figure 1:
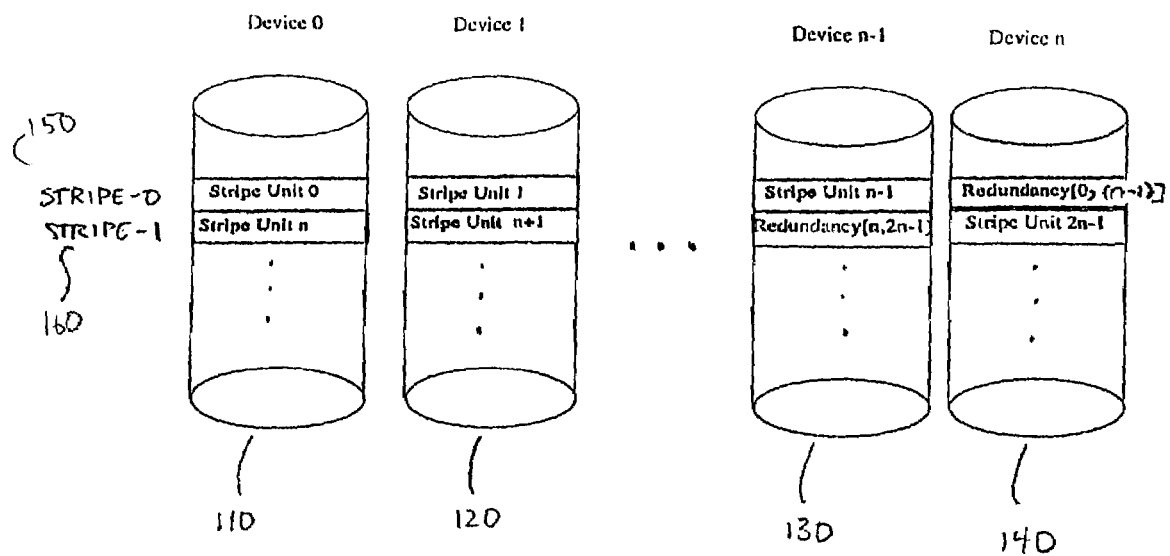
FIG. 1 is a block diagram of a data storage system in a redundant array of independent disks (RAID) level 5 configuration.

Reference will now be made in detail to the preferred embodiments of the present invention, a method and apparatus for fast initialization of a redundant array of storage devices while allowing concurrent access to the array, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "processing," "computing," "translating," "calculating," "determining," "scrolling," "displaying," "recognizing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2:
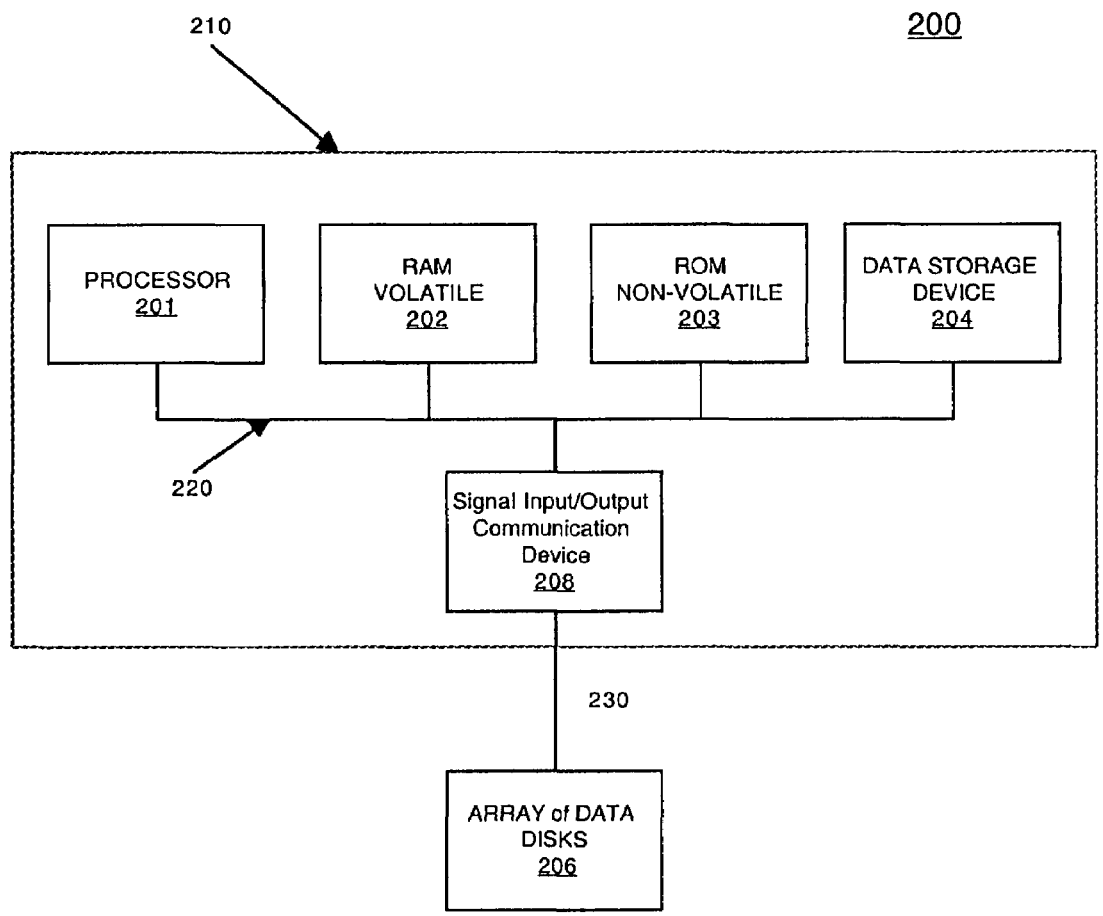
FIG. 2 is a logical block diagram of an exemplary array controller, in accordance with an embodiment of the present invention.

Referring to FIG. 2, embodiments of the present invention are comprised of computer-readable and computer-executable instructions which reside, for example, in computer-readable media of an electronic storage system 200. FIG. 2 is a block diagram of exemplary embedded components of the storage controller 210 upon which embodiments of the present invention may be implemented. Exemplary storage controller 210 includes an internal address/data bus 220 for communicating information, a central processor 201 coupled with the bus 220 for processing information and instructions, a volatile memory 202 (e.g., random access memory (RAM), static RAM dynamic RAM, etc.) coupled with the bus 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

With reference still to FIG. 2, an optional signal Input/Output (I/O) device 208 is shown. The I/O device 208 is coupled to bus 220 for providing a communication link between storage controller 210 and an array network of data storage devices, such as the array of data disks 206. As such, signal I/O device 208 enables the central processor unit 201 to communicate with or monitor other electronic systems blocks that are coupled to the storage controller 210.

The Input/Output device 208 could be an I/O interface that is associated with the bus 220. Data from the storage controller 210 travels through a port and onto an external bus 230 that provides for data transfer between components of the data storage system 200, including between array controller 210 and an array of disk drives 206.

Fast Initialization of a Redundant Array of Storage Devices

A method and apparatus are described for fast initialization of a volume in a redundant array of storage devices, in accordance with embodiments of the present invention. The embodiments may also provide for fast initialization while concurrently allowing access to the volume.

Figure 3:
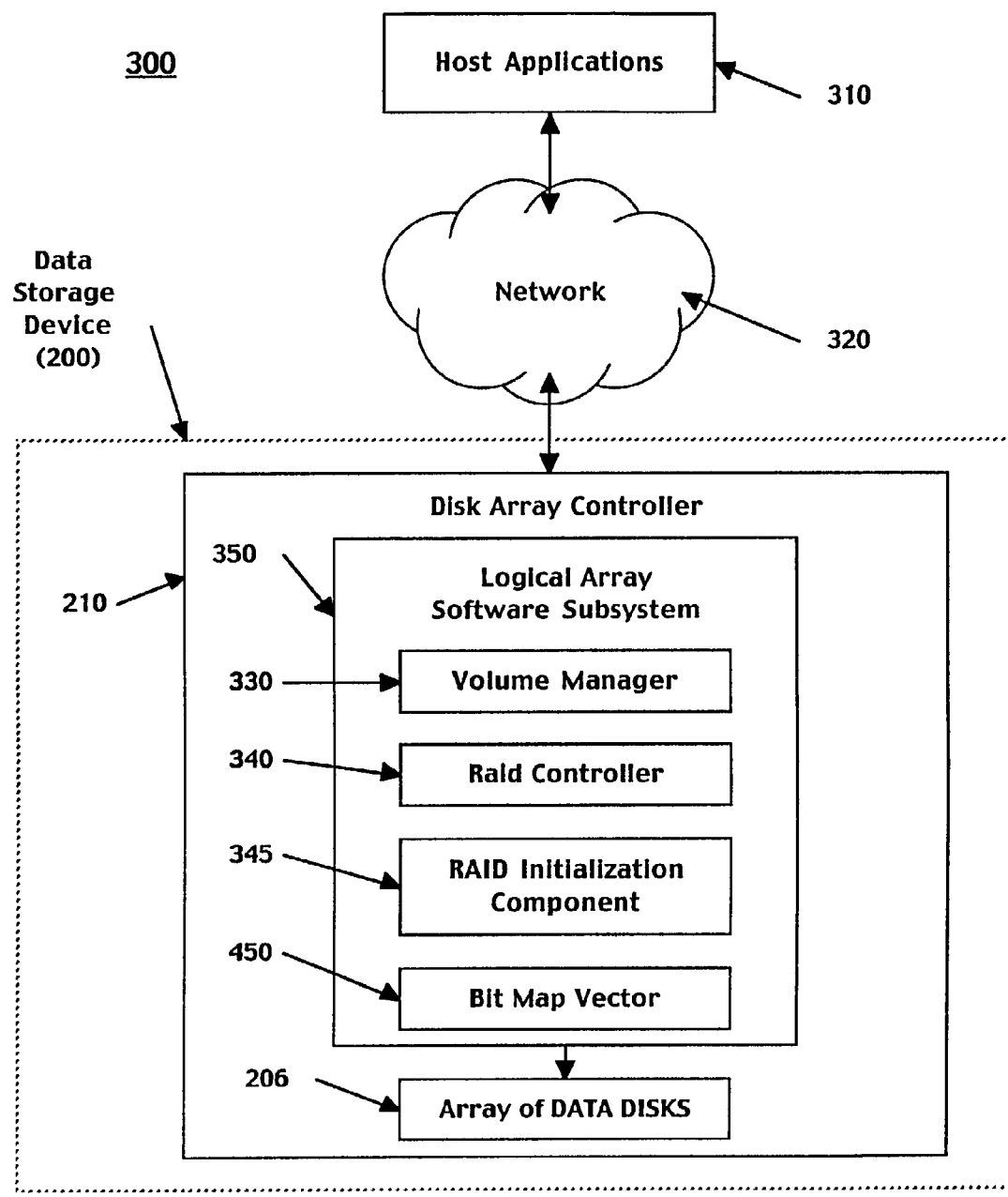
FIG. 3 is a block diagram of a communication network including a data storage system capable of initializing an array of storage devices while concurrently allowing access to that array of storage devices, in accordance with embodiments of the present invention.

Referring now to FIG. 3, the block diagram 300 illustrates a communication network 300 that includes the data storage system 200 of FIG. 2, in accordance with one embodiment of the present invention. The data storage system 200 of FIG. 3 includes the disk array controller 210 of FIG. 2, and the array of data disks 206, or disk farm, in one embodiment.

The data storage system 200 of FIG. 3 illustrates the management and initialization architecture of the logical array subsystem 350 contained within data storage system 200. One or more host applications 310 are coupled to the data storage system 200 through a network 320.

Access requests are received at the array subsystem 350 at the volume manager 330 from the disk array controller 210. The volume manager 330 presents one or more logical volumes of storage to the host applications via the disk array controller 210. The volume manager 330 also distributes access requests and replys, and translates those requests to access requests to the corresponding physical member disks contained within the array of data disks 206 through software at the RAID controller 340. The volume manager 330 is responsible for maintaining the mapping between each of the virtual devices and the individual disk drives in the array of data disks 206. The volume manager 330 provides device virtualization (creating the logical device), coordinates writing to member disks, and maintains the mapping from the logical device to the member disk.

Contained within the array subsystem 350 is the RAID controller 340 for managing the RAID configuration of the array of data disks 206. The RAID controller 340 distributes the I/O operations to the member disks according to the virtual device mapping being used. In addition, the RAID controller 340 manages the redundancy of data contained within the array of data disks 206.

Furthermore, the RAID controller 340 interacts with a RAID initialization component 345, which initializes the array subsystem 350. The RAID initialization component 345 allows concurrent access to the array subsystem 350 during initialization, specifically the array of data disks 206. The RAID initialization component 340 also manages a bit map vector 450. The bit map vector 450 contains initialization state information for each of the plurality of data storage units.

For purposes of describing embodiments of the present invention, a "storage unit" is defined as a number of stripes that are initialized at each access. The number is chosen based on some optimization criteria. For example, if the term, "storage unit," is defined as a large number of stripes, then the latency incurred by a user command increases while the number of accesses to initialize an entire volume is reduced. In one embodiment, each of the plurality of data storage units is one stripe across the data disks associated with the logical volume of storage. In other embodiments, each of the plurality of data storage units can be multiple stripes across the data disks associated with the logical volume of storage.

The bit map vector 450 can be stored and updated in nonvolatile and fault tolerant memory to preserve the vector 450 should the system crash while the logical volume has not been fully initialized, in one embodiment of the present invention. The bit map vector 450 can be stored in a reserved location in the logical volume that is non-volatile and fault tolerant. More particularly, the bit map vector 450 can also be stored in non-volatile random access memory (NVRAM) to further improve performance.

Depending on the initialization state of the data storage unit accessed by an access request, the RAID initialization component can pass an access request through to the data storage unit that is being accessed in the array of data disks 206, reply to the access request, and/or initialize the data storage unit that is being accessed.

In another embodiment, the logical array subsystem 350 is comprised of the array of data disks 206. The array subsystem 350 is comprised of a logical volume of storage including the array of data disks 206. In one embodiment, the logical volume of storage is further comprised of a plurality of stripes. Each stripe extends across all of the data disks within the array 206, and is further partitioned into consecutively numbered stripe units.

Figure 4:
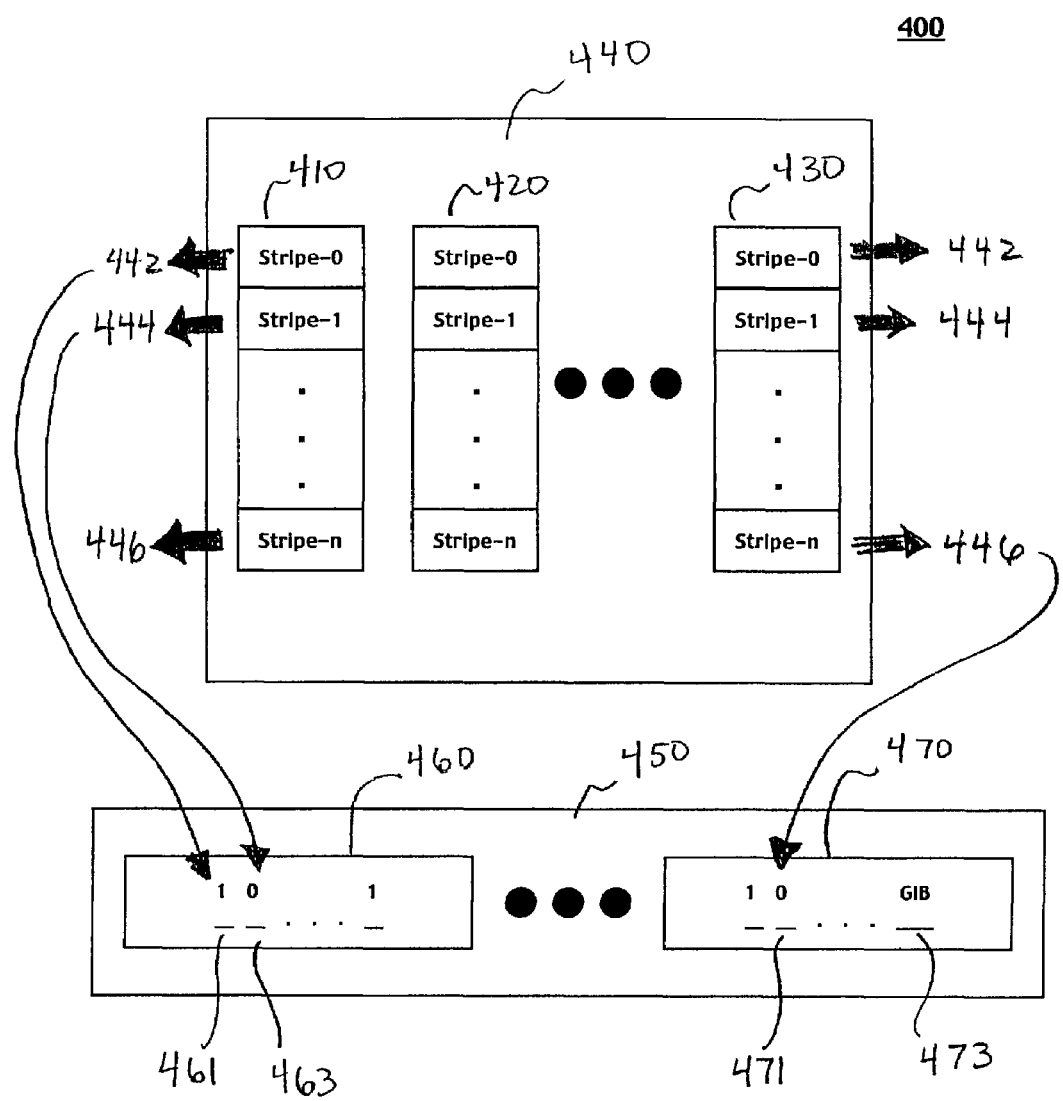
FIG. 4 is a block diagram of a plurality of stripes in a volume of storage with its corresponding bit mapped vector for indicating initialization states for each of the plurality of stripes, in accordance with embodiments of the present invention.

FIG. 4 is a data flow diagram illustrating the interrelationship between a volume 440 and its corresponding bit map vector 450, in accordance with embodiments of the present invention. The volume 440 can be associated with the array subsystem 350 of FIG. 3, in one embodiment. A block diagram of the array subsystem 350 is shown in FIG. 4 to include "m" physical devices. In one embodiment, the physical devices can be disk drives, such as, disk drive 410, disk drive 420, on up to $m^{th}$ disk drive 430. The array 350 comprises a logical volume 440 of storage as controlled by the volume manager 330 of FIG. 3.

The volume 440 is further subdivided into a plurality of data storage units, e.g., stripes, made up of consecutive stripe units from various physical devices in the volume 440. For purposes of demonstration, the volume 440 is comprised of a plurality of n stripes, e.g., stripe-0 442, stripe-1 444, on up to stripe-n 446. Each of the plurality of stripes in the volume 440 are spread uniformly across each of the disk drives in the array 350 in FIG. 4. Further, each of the plurality of stripes is of a fixed length or size. For example, stripe-0 442 is comprised of stripe units in each of the disk drives of the array subsystem 350.

Other embodiments, however, are well suited to stripes and stripe units of various sizes as defined to work within array subsystems of uniform or varying sizes of physical storage devices. In that case, stripes may not extend throughout each of the physical devices in an array subsystem. Also, stripes need not be of fixed lengths. Further, stripe units on a particular physical device within an array subsystem may be of varying sizes.

FIG. 4 also illustrates the bit map vector 450 including a plurality of bits, in accordance with embodiments of the present invention. In one embodiment, each of the plurality of bits corresponds to one of the plurality of stripes in the volume 440. For example, stripe-0 442 corresponds to bit 461; stripe-1 444 corresponds to bit 463; and stripe-n corresponds to bit 471.

In other embodiments, each of the bits in the bit map vector 450 can correspond to multiple stripes that can be initialized as a group. For example, stripe-0 442 and stripe-1 444 can be combined into one group that is represented by one bit in the bit map vector 450.

The bit map vector 450 can be arranged in word units of various sizes (e.g., 16 bit, 32 bit, 64 bit, etc.). Bit map vector 450 illustrates word 460 and word 470. The bits in word 460 include the bits 461 and 463, respectively corresponding to stripe-0 442 and stripe-1 444. The bits in word 470 include the bit 471 that corresponds to stripe-n 446.

Each of the plurality of bits in bit map vector 450 include state initialization information regarding its corresponding stripe in the volume 440. In this manner, the bit map vector 450 is referenced to determine whether an accessed stripe is initialized or not. As such, instead of writing a known pattern to each of the physical devices associated with the volume 440 for initialization, a lengthy process during which the volume cannot be accessed, the bit mapped vector is allocated and initialized to show that each of the plurality of stripes in the volume 440 has not been initialized.

Within the context of the present invention, a volume, stripe, or group of stripes, that have not been initialized or fully initialized is hereinafter referred to as an "un-initialized" volume or stripe. In the present embodiment, initialization of the bit map vector 450 can occur in sub-seconds.

Thereafter, the bit map vector 450 can be used to allow immediate access to the volume 440 and to allow write requests to the volume to initialize the plurality of stripes in the array 350. If an accessed stripe is initialized, then the data on the stripe is consistent with its redundancy. On the other hand, if the accessed stripe is un-initialized, the data on that stripe is not consistent with its redundancy, and no piece of the stripe has ever been initialized. Appropriate measures can be taken either to initialize that stripe, or group of stripes associated with the associated bit in the bit map vector 450. Also, values that indicate a freshly initialized stripe can be returned (e.g., values of "0" in some embodiments).

The assignment of a high or low value to indicate an initialization state is arbitrary. However, embodiments of the present invention set a value of "1" to a bit in the bit map vector 450 to represent an un-initialized state for its corresponding stripe. In this case, when the bit map vector 450 is allocated, the value of "1" should be set in all the bits in the bit map vector 450.

Correspondingly, a value of "0" set for a bit indicates that its corresponding stripe is initialized. For example, stripe-0 442 corresponds to bit 461 with a value of 1, which indicates stripe-0 442 is un-initialized. On the other hand, stripe-1 444 corresponds to bit 463 with a value of 0, which indicates stripe-1 444 is initialized.

By setting a bit with a value of "0" to indicate initialization, an entire word can be checked quickly to determine if bits and their corresponding stripes are initialized. If all the stripes in a word containing corresponding bits are initialized, then each of the bits are set to "0" and the entire word also has a value of "0," which can be quickly checked.

Furthermore, once each of the plurality of stripes is initialized, the volume 440 in the entire array 350 is initialized. In embodiments of the present invention, the bit mapped vector can be freed and no longer referenced, since the volume is initialized. A global initialization bit (GIB bit) 473 can be set to indicate that the entire volume 440 is initialized. In one embodiment, the GIB bit is independent from the bit map vector 450. In another embodiment, the GIB bit 473 can be set to "0" to indicate that the entire volume 440 is initialized. Correspondingly, when the GIB bit 473 is set to "1," the volume 440 is not entirely initialized and the bit map vector 450 would still need to be referenced. Once the GIB bit 473 is set to indicate the entire volume 440 is initialized, read and write requests can be directly processed without referencing the bit mapped vector.

The bit map vector 450 and the GIB bit 473 can be stored in stable storage should the data storage system crash before the array subsystem 350 is fully initialized, in accordance with one embodiment of the present invention. Since power failures can occur before the entire array subsystem 350 is initialized, both the GIB bit 473 and the bit mapped vector can be stored in non-volatile and fault tolerant memory. In one embodiment, the physical devices (e.g., 410, 420, and 430) in the volume 440 have reserved sectors for storing array configuration data in a non-volatile and fault tolerant manner. The same reserved area can be used to store the GIB bit 473 and the bit map vector 450.

In another embodiment, for backward compatibility with the existing array devices, the GIB bit 473 and the bit map vector 450 can be written to a reserved area of the RAID device itself. This scheme is especially beneficial for RAID devices that are equipped with fault-tolerant and non-volatile write back cache controllers. Because each update to the bit map vector 450 only updates the non-volatile cache, writes to the physical storage devices for the bit mapped vector will be minimized. For additional performance improvement, the bit map vector 450 can be stored in non-volatile random access memory (NVRAM).

Figure 5:
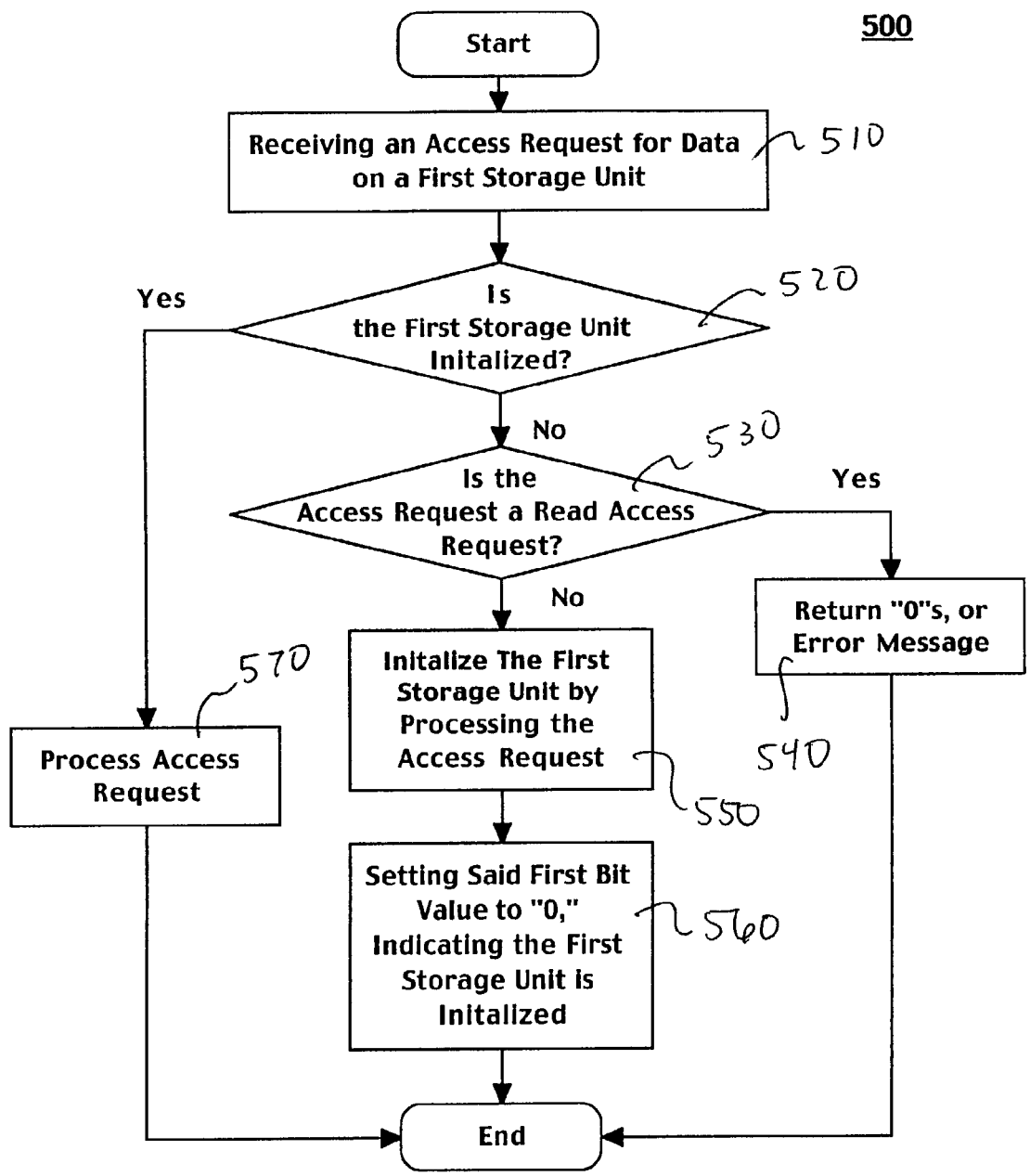
FIG. 5 is a flow diagram illustrating-steps in a computer implemented method for initializing a volume of data storage by using write accesses to the volume while concurrently allowing access to the volume, in accordance with embodiments of the present invention.
Figure 6:
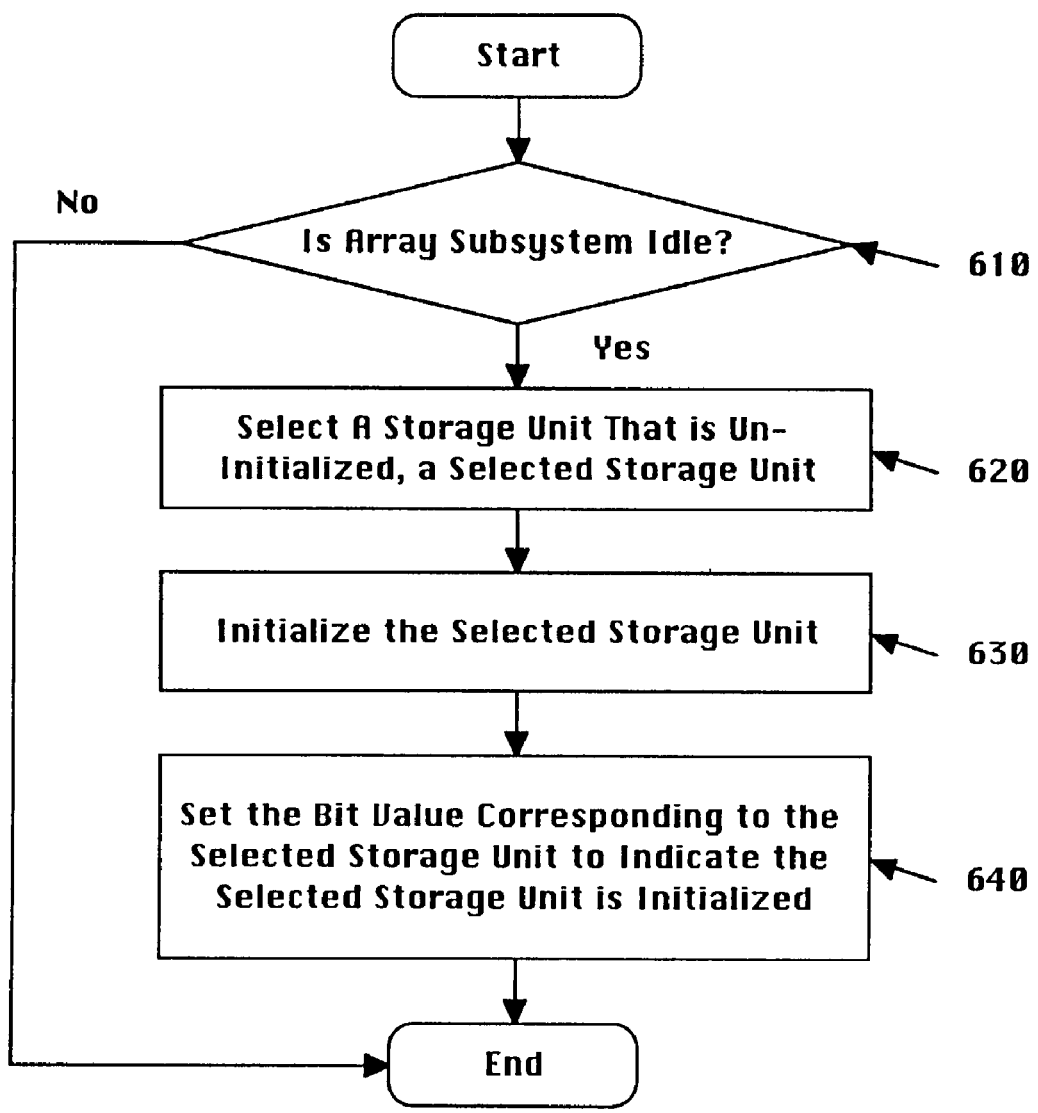
FIG. 6 is a flow diagram illustrating steps in a computer implemented method for initializing a volume of data storage while the volume of data is idle, and while concurrently allowing access to the volume, in accordance with embodiments of the present invention.

FIGS. 5 and 6 are flow diagrams illustrating steps in computer implemented methods for providing initialization of a volume of storage while concurrently allowing access to the volume of storage in embodiments of the present invention. As mentioned previously, once an array of physical devices is set up, a bit mapped vector is allocated and initialized to indicate that each of the plurality of storage units (e.g., stripes) in the array is un-initialized. The bit mapped vector is initialized in this manner before the steps in flow charts 500 and 600 of FIGS. 5 and 6, respectively, are implemented.

Referring now to FIG. 5, flow chart 500 illustrates steps in a method for initializing a volume of storage using access requests, in accordance with one embodiment of the present invention. In step 510, an access request is received for accessing data from a first storage unit in a plurality of storage units. In one embodiment, the plurality of storage units is a plurality of stripes in a volume of storage comprising an array of physical devices, such as, disk drives. In another embodiment, the access request is received at a storage controller, such as controller 210 in FIG. 2, before being passed on to the volume controller that controls access to the plurality of storage units.

In one embodiment, a storage unit is comprised of multiple stripes in a volume of storage comprising an array of physical devices. In another embodiment, a storage unit is comprised of a single stripe in a volume of storage comprising an array of physical devices.

The present embodiment then determines whether the first storage unit is initialized in decision step 520. This is accomplished by referring to the corresponding bit, a first bit, in a bit mapped vector. In one embodiment, a value of "0" indicates an initialized state for a storage unit, and a value of "1" indicates an un-initialized state for a storage unit.

If the first storage unit is initialized, then the present embodiment proceeds to step 570 and processes the access request. Since the first storage unit is initialized, the data in the first storage unit is known to be valid and known to correspond to its redundancy or redundancies. As such, the first storage unit can be fully accessed (e.g., a read or write access).

If the first storage unit is un-initialized, then the present embodiment proceeds to decision step 530 to determine whether the access request is a read or write access request. In decision step 530, if the access request is a read access request, then the present embodiment proceeds to step 540. Since the first storage unit is un-initialized, the data located in the first storage unit is not valid and cannot be used. However, the volume of storage is assumed to be initialized, and as such, predetermined initialization values would have been written onto the first storage unit. In one embodiment, low values of "0" are assumed to have been written to the first storage unit. As such, the present embodiment, without reading the data on the first storage unit, would return values of "0"s, or an error message indicating access is to data and its corresponding data storage unit that is not initialized.

If the present embodiment determines that the access request is not a read access request in decision step 530, then the access request is a write access request, and the present embodiment proceeds to step 550. The present embodiment uses the write access request to initialize the first storage unit by writing data to the first storage unit. As such, in step 550, the present embodiment writes data associated with the write access request to the first storage unit.

Correspondingly, the redundancy or redundancies associated with the stripe or stripes in the first storage unit is updated to reflect the newly written data. As such, the first storage unit become initialized because the newly written data to the stripe or stripes in the first storage unit is known to correspond to its redundancy. In this manner, the present embodiment can initialize the entire volume by using write accesses and setting the redundancies accordingly. Furthermore, in this manner the volume can be concurrently accessed during the initialization process.

The present embodiment then proceeds to step 560 in order to clear the first bit (e.g., set the first bit to "0"). As such, future accesses to the first storage unit can have full read and write access, since the first storage unit has now been initialized.

In another embodiment of the present invention, in writing data to any portion of a storage unit, the corresponding redundancies must be updated. Two possible situations exist regarding writing data to a storage unit that is a stripe. In the first case, the data to be written contains the entire stripe, and is thus referred to as Full Stripe Write. In this case, the redundancies can be generated strictly from the data to be written, and the entire stripe can be written to the physical devices.

In the second case, the data to be written contains part of a stripe, and is thus referred to as Partial Stripe Write. To update the redundancy, the old data on the remainder of the stripe can be read and used along with the newly written data to generate the redundancy for the entire stripe. Thereafter, the entire stripe can be written to the physical devices. This is referred to as the Read Other Write (ROW) technique, and is most useful when the new data to be written spans more than half of the data stripe.

However, in a Partial Stripe Write, when the new data spans less than half of the data stripe, a technique referred to as Read Modify Write (RMW) is employed. This technique is based on a mathematical idempotent property of the redundancy generating functions: where $f(x,x)=0$, where x is any piece of data and f is the redundancy generating function. An example of such a function is odd or even (XOR) parity as a binary operation on Boolean variables, which is commonly used in single redundancy RAID arrays.

In the present embodiment, for initialization purposes, each time a RMW operation is targeted to a stripe, the bit corresponding to the stripe is consulted. If the bit indicates that the stripe is not initialized, then the remaining part of the storage unit is assumed to be the default initial pattern. The entire storage unit is written in full stripe writes and the corresponding bit is cleared, otherwise the RMW operation proceeds.

FIG. 6 is a flow chart 600 illustrating steps in a computer implemented method for increasing the rate of initialization while allowing concurrent access to the plurality of storage units, in accordance with one embodiment of the present invention. As mentioned previously, a storage controller that coordinates initialization of an array subsystem, an array of physical devices, that includes the plurality of storage units can implement the method illustrated in flow chart 600, in another embodiment.

The present embodiment determines whether the array subsystem is idle in step 410 in a background-process. If idle, the storage system containing the array subsystem is processing less than a predefined threshold number of access requests in relation to the array subsystem. If the array subsystem is not idle, then the present embodiment defers to allow processing of the access requests. As such, this initialization occurs in the background of any current or future processing of access requests. This allows initialization of the array subsystem while concurrently allowing access to the array subsystem.

On the other hand, if the array subsystem is idle, then the present embodiment proceeds to step 420 to initialize the array subsystem. In step 420, a storage unit that is un-initialized is selected, a selected storage unit. In one embodiment, this is enabled by referring to the bit mapped vector and selecting a bit, a selected bit, showing an un-initialized storage unit, the now selected storage unit.

In one embodiment, the selected storage unit is comprised of multiple stripes in a volume of storage comprising an array subsystem of physical devices. In another embodiment, a storage unit is comprised of a single stripe in a volume of storage comprising an array subsystem of physical devices.

In step 430, the present embodiment initializes the selected storage unit. As mentioned previously, the present embodiment can write all "0s" to the selected storage unit and its corresponding redundancy to initialize the selected storage unit. As such, the selected storage unit is initialized since a known pattern is written to the selected storage unit and the known pattern corresponds to its associated redundancies.

Thereafter, in step 440, the selected bit is cleared to indicate the selected storage unit is initialized. This process can occur in the background to any access request. As such, the present embodiment continually initializes each of the plurality of storage units in the array subsystem. Eventually all the bits in the bit mapped vector will have been cleared indicating that each of the plurality of storage units in the array subsystem is initialized.

The present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

The program steps used to implement the embodiments described above can be implemented using disc storage as well as other forms of storage including Read Only Memory (ROM) devices, Random access Memory (RAM) devices; optical storage elements, magnetic storage elements, magneto-optimal storage elements, flash memory, core memory and/or other equivalent storage technologies without departing from the present invention. Such alternative storage devices should be considered equivalents.

While the methods of embodiments illustrated in flow chart 500 and 600 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Embodiments of the present invention, initializing a redundant array of storage devices while concurrently allowing access to the array, is thus described. While the present invention has been described in particular embodiments, it should be appreciated that the present invention should not be construed as limited by such embodiments, but rather construed according to the below claims.

What is claimed is:

1. A computer storage system, comprising:
   a plurality of storage units;
   a bit mapped vector comprising a plurality of bits each corresponding to one of said plurality of storage units and indicating whether its corresponding storage unit is initialized; and
   a controller unit coupled to access said plurality of storage units and said bit mapped vector;
   wherein, in response to a write request to a first one of the storage units that is un-initialized as indicated by a corresponding bit of the bit mapped vector, the controller unit is configured to initialize said first storage unit;
   wherein to initialize said first storage unit, the controller is configured to:
     write data for the write request to said first storage unit,
     generate and store redundancy data correspondina to the data for the write request; and
     set said corresponding bit to a particular value to indicate that said first storage unit has been initialized.

2. The computer storage system as described in claim 1, wherein said controller unit is further configured to allow concurrent access to at least a second storage unit of said plurality of storage units while initializing said first storage unit.

3. The computer storage system as described in claim 1, wherein, in response to a read request to said first storage unit that is un-initialized, said controller unit is further configured to return predetermined initialization values without performing a read operation on said first storage unit.

4. The computer storage system as described in claim 1, wherein to initialize a particular storage unit said controller unit is further configured to write predetermined initialization values to said particular storage unit and set a particular bit of the bit mapped vector corresponding to the particular storage unit to the particular value.

5. The computer storage system as described in claim 1, wherein, in response to a read request to said first storage unit that is un-initialized, said controller unit is further configured to return an error message without performing a read operation on said first storage unit.

6. The computer storage system as described in claim 1, wherein, in response to a read request to a second storage unit that is initialized as indicated by a corresponding second bit of the bit mapped vector, said controller unit is configured to read and return second data from said second storage unit.

7. The computer storage system as deseribed in claim 1, wherein said bit mapped vector is stored in non-volatile and fault tolerant memory.

8. The computer storage system as described in claim 1, wherein one of said plurality of storage units comprises a plurality of stripes in a logical volume of storage for a plurality of disk drives.

9. The computer storage system as described in claim 8, wherein said logical volume of storage is configured in a RAID configuration.

10. The computer storage system as described in claim 1, further comprising:
    a global initialization bit for indicating when all of said plurality of storage units have been initialized.

11. The computer storage system as described in claim 1, wherein said particular value is:
  a bit value of "1" for indicating its corresponding storage unit is un-initialized; and
  a bit value of "0" for indicating its corresponding storage unit is initialized.

12. A data storage systems, comprising:
  a storage volume comprising a plurality of storage units;
  a bit mapped vector comprising a plurality of bits, each bit indicating an initialization state of a respective storage unit of said plurality of storage units; and
  a controller unit coupled to access said plurality of storage units and said bit mapped vector, wherein, in response to a write request for a first one of the storage units, said controller unit is configured to initialize the first storage unit;
  wherein to initialize the first storage unit, the controller is configured to:
    write data to said first storage unit;
    generate and store redundancy information corresponding to the data; and
    set a first bit of said bit mapped vector corresponding to the first storage unit to a particular value to indicate that the first storage unit has been initialized.

13. The data storage system as described in claim 12, wherein, in response to a first read request to a second storage unit in said plurality of storage units, said controller unit is further configured to:
  access a second bit of said bit mapped vector corresponding to said second storage unit; and
  if said second bit indicates an initialized state for said second storage unit, access said second storage unit and return second data from said second storage unit.

14. The data storage system as described in claim 13, wherein if said second bit indicates an un-initialized state, said controller unit is further configured to return a predetermined initialization value in response to said first read request without performing a read operation on said second storage unit.

15. The data storage system as described in claim 12, further comprising:
  a global initialization bit that is set to a first value when all bits in said bit mapped vector are set to indicate an initialized state.

16. The data storage system as described in claim 15, wherein, if said global initialization bit is set to the first value, in response to an I/O request directed at the storage volume, said controller is further configured to perform an I/O operation corresponding to the I/O request without accessing said bit mapped vector.

17. A method of data storage, comprising:
  a) receiving a write request for a first storage unit in a plurality of storage units;
  b) checking a first bit corresponding to said first storage unit to determine if said first storage unit is initialized, said first bit being from a bit mapped vector comprising a plurality of bits each corresponding to a respective storage unit from said plurality of storage units; and
  c) if said first storage unit is un-initialized, initializing said first storage unit;
  wherein said initializing comprises writing data for the write request to said first storage unit, updating redundancy data corresponding to said data for the write request, and setting said first bit to a particular value to indicate that the first storage unit has been initialized.

18. The method of data storage as described in claim 17, wherein c) further comprises:
  allowing access to said plurality of storage units while initializing said first storage unit.

19. A method of data storage, comprising:
  a) receiving a write request for a first storage unit in a plurality of storage units;
  b) checking a first bit corresponding to said first storage unit to determine if said first storage unit is initialized, said first bit being from a bit mapped vector comprising a plurality of bits each corresponding to a respective storage unit from said plurality of storage units; and
  c) using said write request to initialize said first storage unit if said first storage unit is un-initialized;
  d) receiving a read request for a second storage unit in said plurality of storage units;
  e) checking a second bit from said bit mapped vector corresponding to said second storage unit to determine if said second storage unit is initialized;
  f) returning predetermined initialization values if said second storage unit is un-initialized; and
  g) reading and returning data from said second storage unit if said second storage unit is initialized.

20. The method as described in claim 19, wherein f) further comprises:
  returning error messages if said second storage unit is un-initialized.

21. The method as described in claim 19, wherein f) further comprises:
  initializing said second storage unit by writing said predetermined initialization values to said second storage unit; and
  setting said second bit to indicate said second storage unit is initialized.

22. The method as described in claim 17, further comprising:
  setting said plurality of bits in said bit mapped vector to indicate each of said plurality of storage units is un-initialized, wherein said setting is performed before a).

23. A method of data storage, comprising:
  a) receiving a write request for a first storage unit in a plurality of storage units;
  b) checking a first bit corresponding to said first storage unit to determine if said first storage unit is initialized, said first bit being from a bit mapped vector comprising a plurality of bits each corresponding to a respective storage unit from said plurality of storage units; and
  c) using said write request to initialize said first storage unit if said first storage unit is un-initialized;
  d) in a background process, selecting a second storage unit that is un-initialized;
  e) initializing said second storage unit by writing predetermined initialization values to said second storage unit and its corresponding redundancy, while still allowing access to said plurality of data storage units; and
  f) setting a corresponding second bit in said bit mapped vector to indicate said second storage unit is initialized.

24. The method as described in claim 17, further comprising:
  processing said write request if said first bit indicates said first storage unit is initialized.

25. The method as described in claim 17, wherein
  a bit from said plurality of bits set to "1" indicates its corresponding storage unit is un-initialized; and
  a bit from said plurality of bits set to "0" indicates its corresponding storage unit is initialized.

26. A method of data storage, comprising:
a) creating a plurality of bits in a bit mapped vector for indicating a state of initialization for each of a plurality of data storage units, each of said plurality of bits corresponding to a respective storage unit of said plurality of storage units;
b) referencing said bit mapped vector in response to an access request to determine if a first data storage unit being accessed is initialized;
c) if said first data storage unit is un-initialized, initializing said first data storage unit, wherein said initializing comprises: writing data to said first data storage unit, updating redundancy data corresponding to said data, and setting a first bit of the bit mapped vector to a particular value to indicate that the first storage unit has been initialized.

27. The method as described in claim 26, further comprising:
in response to a read request directed to a second data storage unit, if said second data storage unit is un-initialized, returning predetermined initialization values.

28. The method as described in claim 26, further comprising:
referencing a global initialization bit to determine whether all of said plurality of data storage units are initialized.

29. The method as described in claim 28, further comprising:
freeing said bit mapped vector when said global initialization bit is set to indicate all of said plurality of data storage units are initialized.

30. The method as described in claim 26, further comprising:
in a background process, initializing a second data storage unit that is un-initialized in said plurality of data storage units when the second data storage unit is not processing access requests.

31. The method as described in claim 26, wherein said plurality of data storage units are configured in a mirrored RAID configuration, wherein c) further comprises:
assigning a first data storage unit in a pair of data storage units as containing valid data;
copying said valid data to a second data storage unit in said pair of data storage units for initializing said pair of data storage units.

32. A data storage system comprising:
a processor; and
a computer readable memory coupled to said processor wherein said memory contains program instructions that when executed implements a method of data storage comprising:
a) receiving a write request for a first storage unit in a plurality of storage units;
b) checking a first bit corresponding to said first storage unit to determine if said first storage unit is initialized, said first bit being from a bit mapped vector comprising a plurality of bits each corresponding to a respective storage unit from said plurality of storage units; and
c) if said first storage unit is un-initialized, initializing said first storage unit;
wherein said initializing comprises: writing data for the write request to said first storage unit, updating redundancy data corresponding to said data for the write request, and setting said first bit to a particular value to indicate that the first storage unit has been initialized.

33. The data storage system as described in claim 32, wherein c) in said method further comprises:
allowing access to said plurality of storage units while initializing said first storage unit.

34. A data storage system, comprising:
a processor; and
a computer readable memory coupled to said processor wherein said memory contains program instructions that when executed implements a method of data storage comprising;
a) receiving a write request for a first storage unit in a plurality of storage units;
b) checking a first bit corresponding to said first storage unit to determine if said first storage unit is initialized, said first bit being from a bit mapped vector comprising a plurality of bits each corresponding to a respective storage unit from said plurality of storage units; and
c) using said write request to initialize said first storage unit if said first storage unit is un-initialized;
d) receiving a read request for a second storage unit in said plurality of storage units;
e) checking a second bit from said bit mapped vector corresponding to said second storage unit to determine if said second storage unit is initialized;
f) returning predetermined initialization values if said second storage unit is un-initialized; and
g) reading and returning data from said second storage unit if said second storage unit is initialized.

35. The data storage system as described in claim 34, wherein f) in said method further comprises:
returning error messages if said second storage unit is un-initialized.

36. The data storage system as described in claim 34, wherein f) in said method further comprises:
initializing said second storage unit by writing said predetermined initialization values to said second storage unit; and
setting said second bit to indicate said second storage unit is initialized.

37. The data storage system as described in claim 32, wherein said method further comprises:
setting said plurality of bits in said bit mapped vector to indicate each of said plurality of storage units is un-initialized, wherein said setting is performed before a).

38. A data storage system, comprising:
a processor; and
a computer readable memory coupled to said processor wherein said memory contains program instructions that when executed implements a method of data storage comprising:
a) receiving a write request for a first storage unit in a plurality of storage units;
b) checking a first bit corresponding to said first storage unit to determine if said first storage unit is initialized, said first bit being from a bit mapped vector comprising a plurality of bits each corresponding to a respective storage unit from said plurality of storage units: and
c) using said write request to initialize said first storage unit if said first storage unit is un-initialized;
d) in a background process, selecting a second storage unit that is un-initialized;
e) initializing said second storage unit by writing predetermined initialization values to said second storage unit and its corresponding redundancy, while still allowing access to said plurality of data storage units; and f) setting a corresponding second bit in said bit mapped vector to indicate said second storage unit is initialized.

39. The data storage system as described in claim 32, wherein said method further comprises:
processing said write request if said first bit indicates said first storage unit is initialized.

40. The data storage system as described in claim 32, wherein in said method:
a bit from said plurality of bits set to "1" indicates its corresponding storage unit is un-initialized; and
a bit from said plurality of bits set to "0" indicates its corresponding storage unit is initialized.

41. The computer storage system as described in claim 1, wherein the controller unit is further configured to store the redundancy data within the first storage unit.

42. The computer storage system as described in claim 1, wherein the controller unit is further configured to store the bit-mapped vector within a reserved sector of said plurality of storage units.

43. The computer storage system as described in claim 1, wherein the first storage unit comprises one or more stripes of a logical volume, wherein the write request is directed to a portion of a stripe of the one or more stripes, wherein, in response to the write request, the controller unit is further configured to write data to the entire first storage unit in full stripe writes to initialize the first storage unit.

44. The method as described in claim 17, further comprising:
making a determination whether the one or more storage units are idle; and
if a result of the determination is positive,
initializing an uninitialized storage unit of the one or more storage units.

45. The method as described in claim 44, further comprising:
wherein the result of the determination is positive if the one or more storage units are processing less than a predefined threshold number of access requests.

* * * * *

UNITED STATES PATENT AND TRADEMARK OFFICE
CERTIFICATE OF CORRECTION

PATENT NO. : 6,993,676 B2  Page 1 of 1
APPLICATION NO. : 10/170937
DATED : January 31, 2006
INVENTOR(S) : Corbin et al.

It is certified that error appears in the above-identified patent and that said Letters Patent is hereby corrected as shown below:

Column 12,
Line 21, delete "correspondina" and substitute --corresponding--.

Signed and Sealed this

Fourth Day of July, 2006

JON W. DUDAS
*Director of the United States Patent and Trademark Office*